United States Patent [19]

Kappenhagen

[11] 4,316,316

[45] Feb. 23, 1982

[54] SHIPPING ASSEMBLY FOR A HYDRAULIC JACK

[75] Inventor: George A. Kappenhagen, Monroe Township, Monroe County, Pa.

[73] Assignee: Westinghouse Electric Corp., Pittsburgh, Pa.

[21] Appl. No.: 172,789

[22] Filed: Jul. 28, 1980

[51] Int. Cl.[3] .............................................. B23P 19/00

[52] U.S. Cl. ..................................... 29/426.1; 29/428; 29/240; 138/89; 138/96 R; 92/77; 92/161; 285/354; 285/DIG. 2; 206/321

[58] Field of Search ....................... 29/426.1, 451, 234; 138/89, 96 R; 285/354

[56] References Cited

U.S. PATENT DOCUMENTS 4,036,261 7/1977 Hauk et al. ....................... 138/89 X 4,219,226 9/1980 Kappenhagen ..................... 285/354

*Primary Examiner*—Milton S. Mehr

*Attorney, Agent, or Firm*—D. R. Lackey

[57] ABSTRACT

A shipping assembly for a hydraulic jack in which the cylinder of the jack is shipped in sections. First and second shipping caps are fastened to predetermined ends of the cylinder sections during shipment, with the first shipping cap utilizing certain of the same cylinder joint fastening hardware which will subsequently be used to join the cylinder sections at the job site. The first and second shipping caps are cooperatively configured to enable them to be assembled into a complete, self-contained shipping package for return to the factory, using the fastening hardware used to secure the second shipping cap to a cylinder section.

24 Claims, 12 Drawing Figures

SHIPPING ASSEMBLY FOR A HYDRAULIC JACK

BACKGROUND OF THE INVENTION

1. Field of the Invention

The invention relates in general to hydraulic jacks, and more specifically to shipping assemblies for protecting the hydraulic cylinder and plunger of a hydraulic jack during shipment.

2. Description of the Prior Art

Hydraulic elevators use a jack unit which includes a plunger, and a cylinder made from steel pipe or steel tubing. When the required lift or vertical travel of the elevator exceeds approximately twenty feet, the cylinder and plunger are shippped to the job site in sections, which sections are then assembled.

The cylinder sections are assembled, using a cylinder joint construction, such as shown in my copending application Ser. No. 928,636, filed July 27, 1978, now U.S. Pat. No. 4,219,226, which is assigned to the same assignee as the present application. It is important that the ends of the sections to be coupled be protected from damage during shipment. Further, the shipping protection must provide moisture seals to prevent moisture from entering the inside of the cylinder sections where it may rust and corrode threads and other machined areas of the cylinder head, cylinder joints, plunger joints, and the like, which must be maintained absolutely clean and free of corrosion for proper field assembly, and proper functioning after assembly. A caulk compound is conventionally used to provide moisture seals during shipment, but this practice requires extensive cleaning of the caulked parts in the field.

Finally, it would be desirable to provide shipping protection for the cylinder and plunger sections, which is quickly and easily applied, removed, and returned to the factory for reuse.

SUMMARY OF THE INVENTION

Briefly, the present invention is a new and improved shipping assembly for a hydraulic jack which is shipped to the job site in sections. First and second different, basic shipping cap assemblies are utilized to protect the ends of the cylinder sections. The first shipping cap assembly is constructed to protect the upper ends, with reference to their locations in the final vertical operative position of the cylinder, of the bottom and any intermediate cylinder sections. The second shipping cap assembly is constructed to protect the lower ends of the top and any intermediate cylinder sections. Thus, the first and second shipping cap assemblies are referred to as the top and bottom shipping cap assemblies, respectively.

The top shipping cap assembly includes a first cylindrical portion secured to the requisite joint end using the same fastening means which will subsequently be used to form a cylinder joint between two cylinder sections in the field. This fastening means includes grooves for O-ring moisture seals for the cylinder joint, and the same grooves are utilized, along with O-rings, to provide moisture seals in the top shipping cap assembly. Since the coupling components used to fasten the top shipping cap are the same as those which will be used to couple two cylinder sections, the presence of the correct size components for field use is absolutely assured. Further, the "training" the field personnel receives in removing the top shipping cap is immediately put to use in assembling two cylinder sections, as the joint just disassembled is similar to the one which will be made between the cylinder sections, and it uses the same coupling components. The use of the O-ring grooves already present in the coupling components makes it unnecessary to use caulk compound, thus eliminating a messy and time consuming clean-up operation in the field.

The top shipping cap assembly additionally includes a second cylindrical, tubular portion which extends into the opening in the cylinder section, with this tubular portion having threads on its I.D. for threadably engaging one end of a coupling, the other end of which is threadably engaged with the upper end of a plunger section. Thus, the top shipping cap assembly also functions to secure and center one end of a plunger section.

The bottom shipping cap assembly includes a tubular portion secured to the requisite joint end with fastening means in the form of a split ring or clamp. The split ring is quickly assembled about the tubular portion and about a circumferential stop on the cylinder section by merely inserting four bolts, such as Allen head bolts, through openings provided in one of the ring halves, and threadably engaging the bolts with tapped openings in the other ring half. The circumferential stop on the cylinder section is a part of the cylinder joint, and is thus already available. The tubular portion includes a groove in its I.D. for an O-ring, which provides a moisture seal between the I.D. of the tubular portion and the O.D. of the cylinder section. The split ring is relatively inexpensive to manufacture, as it is not threadably engaged with the cylinder section, and it thus has no costly threads to machine and to subsequently protect from damage.

A non-metallic ring member disposed in the tubular portion of the bottom shipping cap assembly protects the end of a cylinder section, and it also has a central opening therein which is sized to snuggly receive and center the other end of the plunger section, which end is opposite to its externally threaded end.

The top and bottom shipping cap assemblies are removed in the field during assembly of the plunger sections, and assembly of the cylinder sections, with the top cap aiding such assembly. They are then assembled into a complete, self-contained shipping package for return to the factory. The first cylindrical portion of the top shipping cap assembly forms a cover for the tubular portion of a bottom shipping cap assembly. The second cylindrical portion of the top shipping cap assembly, which includes the threaded I.D. for supporing a plunger section, is enclosed by the tubular portion of the bottom shipping cap assembly, and thus completely protected. The same fastening means used to secure the bottom shipping cap assembly to a cylinder section is now used to couple the top and bottom shipping cap assemblies into a shipping package. An address label is permanently fixed to the outside of the tubular portion of the bottom shipping cap assembly. Since there are no exposed threads on either the top or bottom shipping cap when assembled in this shipping package, the shipping caps may be reused a large number of times without impairment of function or degradation in the ease of assembly and disassembly.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
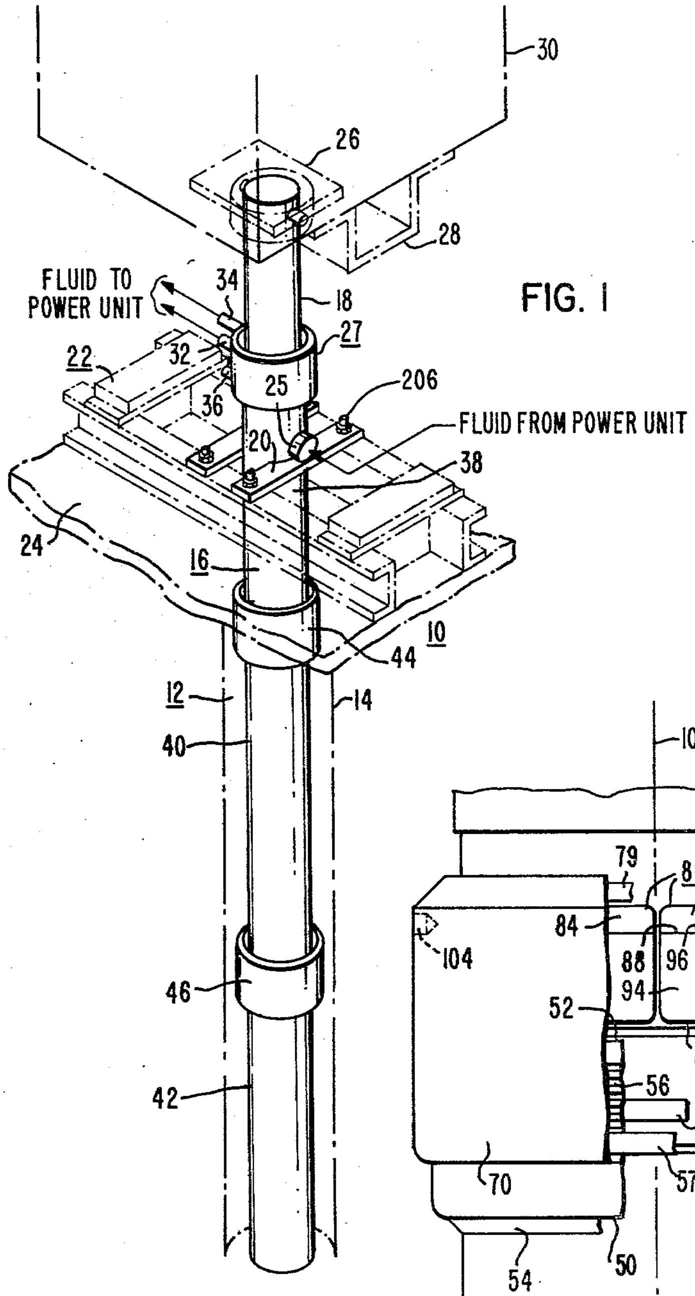
FIG. 1 is a perspective view, partially in phantom, of hydraulic elevator apparatus which uses a hydraulic jack which may be shipped from the factory to the job site using shipping assemblies constructed according to the teachings of the invention.

Referring now to the drawings, and FIG. 1 in particular, there is shown hydraulic elevator apparatus 10 which may utilize the teachings of the invention. Hydraulic elevator apparatus 10 includes a jack assembly 12 disposed in a jack hole 14. The jack assembly 12 includes a cylinder 16, usually constructed of steel pipe, and a plunger 18 which is usually formed of steel tubing. Steel load bearing brackets 20 are welded to the outside of the cylinder 16, and these brackets support the cylinder 16 on a footing channel assembly 22, shown in phantom, which is located on the floor 24 of the pit. The cylinder 16 also includes a fluid pipe inlet 25, which may be located just above the load bearing brackets 20, as illustrated, and a cylinder head 27.

The upper end of the plunger 18 includes a platen plate 26 which is fastened to a car bolster assembly 28, which is part of a supporting structure for an elevator car 30 shown in phantom. The cylinder head 27 includes a scavenger line 32, which returns fluid leakage to the power unit (not shown), an excess fluid gravity drain line 34, and an air purge valve 36. The cylinder head 27 also includes bearing means for guiding the plunger 18, and travel limit means for smoothly decelerating and stopping the plunger 18 when a predetermined travel limit is reached.

Depending upon length, the cylinder 16 may be shipped to the job site in sections. For purposes of example, cylinder 16 is illustrated as having an upper or top section 38, an intermediate section 40, and a lower or bottom section 42. Cylinder joints 44 and 46 interconnect the top and intermediate sections 38 and 40, and the intermediate and bottom sections 40 and 42, respectively.

Figure 2:
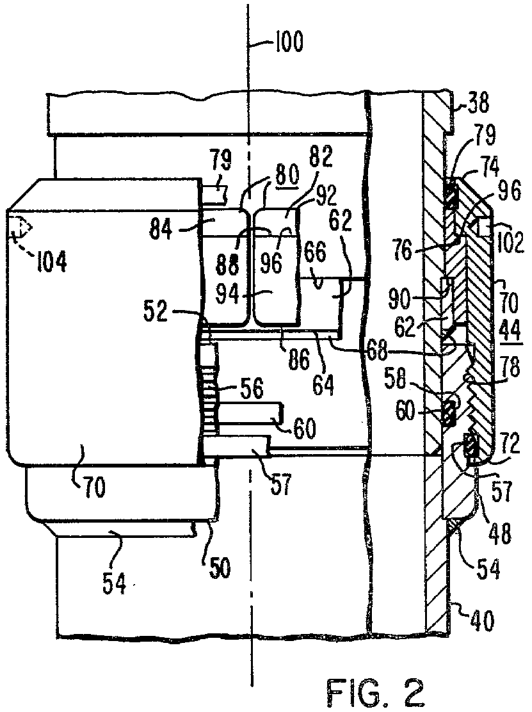
FIG. 2 is an elevational view, shown partially in section, with parts broken away, of a cylinder joint which may be used to couple the cylinder sections of the cylinder shown in FIG. 1.

For purposes of example, it will be assumed that the cylinder joints 44 and 46 are essentially the same as the cylinder joint described my U.S. Pat. No. 4,219,226, which is based upon application Ser. No. 928,636 filed July 27, 1978, which is assigned to the same assignee as the present application. For convenience, FIG. 1 of this patent, modified to include two additional O-ring seals, appears as FIG. 2 of the instant application, as the shipping caps of the invention utilize certain of the cylinder joint coupling parts. Since joints 44 and 46 are similar in construction, only joint 44 will be described in detail. FIG. 2 is an elevational view of joint 44, shown partially cut away and partially in section, to clearly illustrate the components of the joint. Only the details of joint 44 which are important to the present invention will be described in detail, as my hereinbefore mentioned U.S. Patent may be referred to for more details, if needed.

The cylinder sections are constructed of similarly dimensioned steel pipe or tubing, with typical outside diameters presently being in the range of 5 to 12 inches, and with wall thicknesses presently in the range of 0.220 to 0.375 inch.

A first steel cylindrical coupling member 48 having first and second axial ends 50 and 52 is telescoped onto the upper end of the intermediate cylinder section 40. The longitudinal length of the first coupling member 48 is selected such that its end 52 extends outwardly past the upper end of the intermediate cylinder section by a predetermined dimension. The predetermined dimension is selected such that it is sufficient to facilitate and maintain alignment of the cylinder sections to be coupled. End 50 is then welded to the adjacent outer surface of the intermediate cylinder section 40, as indicated by weld bead 54. The external surface of the first coupling member 48 is threaded, as indicated at 56, with a space being provided at the lower end of the threads for receiving a resilient sealing member or O-ring 57. The internal surface or bore of the first coupling member 48 includes an internal groove 58 for receiving a resilient sealing member or O-ring 60.

The top cylindrical section 38 includes a circumferential stop on its O.D., such as may be provided an annular or ring-shaped member 62. Member 62 has first and second axial ends 64 and 66, respectively, and an I.D. which is selected to be a sliding fit with the O.D. of the top cylinder section 38. Member 62 is telescoped over the lower end of cylinder section 38 and secured in the desired position by welding end 64 to the outer surface of the top cylinder section 38, as indicated by weld bead 68.

A second steel cylindrical coupling member 70 is provided which has first and second axial ends 72 and 74, respectively. Coupling member 70 includes an aperture or opening which starts at its second end 74, which has a first predetermined diameter sized to enable coupling member 70 to be telescoped over the lower end of the top cylinder section 38, and to clear or pass the circumferential stop provided by member 62. The inside diameter of the second coupling member 70, which started at end 74, then steps outwardly to a second inside diameter, which is larger than the first inside diameter, with the transition forming a shoulder 76. The bore continues smoothly at this larger inside diameter towards end 72 for a predetermined dimension, and then the inside diameter is threaded, as illustrated at 78, with the threads 78 being constructed to cooperate with the external threads 56 on the first coupling member 48. The I.D. adjacent to its end 74 is grooved to receive and O-ring 79, and its I.D. adjacent to end 72 is provided with a suitable clearance below the threads for forming a moisture seal via an O-ring 57.

A split ring assembly 80 is provided having first and second similar half sections 82 and 84, respectively. Since each half section 82 and 84 is similar to the other, only half section 82 will be described in detail. Half section 82 has first and second axial ends 86 and 88, respectively, and a substantially Z-shaped cross-sectional configuration. Half section 82 includes a surface having a first inside diameter, with the first inside diameter starting at its end 88 and extending smoothly towards its end 86 for a predetermined dimension. It then steps outwardly to a surface having a second inside diameter, which is larger than the first inside diameter, forming a shoulder 90 at the transition.

Half section 82 has a first outer surface 92 having a first outside diameter which starts at end 88, and it extends towards end 86 for a predetermined dimension where it steps outwardly to a second outer surface 94 having a second outside diameter. The second outside diameter is larger than the first, and the second outside diameter extends smoothly to end 86. A shoulder 96 is formed at the transition between the first and second outside diameters. While shoulders 90 and 96 are illustrated as being 90°, they may be slightly less, or slightly greater than 90°, such as in the range of 70° to 100°, to increase the locking action of the split ring assembly 80.

In the assembly of the top and intermediate cylinder sections 38 and 40, the second coupling member 70 is telescoped over the lower end of top cylinder section 38, past the circumferential stop 62, and section 40 is oriented on a vertical axis 100. The top cylinder section 38 is vertically oriented above section 40, on axis 100, and it is gently lowered such that its lower end enters the socket or outwardly extending portion of the first coupling member 48 to establish the internal pressure seal via O-ring 60. This slip-fit coupling is continued until the lower end of the top section 38 rests upon the upper end of the intermediate cylinder section 40, with the complete weight of section 38 being supported by section 40.

The next step of the assembly procedure involves assembly of the two halves 82 and 84 of the split ring 80 about the top cylinder section 40. Then, the second coupling member 70 is lowered until its threads 78 initially contact threads 56 of the first coupling member 48. The second coupling member 70 is then threadably engaged with the first coupling member 48, with the second coupling member 70 being advanced until shoulder 90 of the split ring 80 contacts stop member 62. Since there is no weight applied to the threads, and since the two sections are accurately aligned, coupling member 70 will turn freely until the circumferential stop 62 is reached. Now, a fraction of a turn by a suitable tool such as a spanner wrench, placed in suitable openings in the outside diameter of the second coupling member, such as openings 102 and 104, will cause the first and second coupling members 48 and 70, respectively, along with the split ring asembly 80 and stop member 62 to cooperate and function as a locking collar, which provides a strong mechanical joint, and a fluid-tight seal via the seaing rings 57, 60 and 79.

Figure 3:
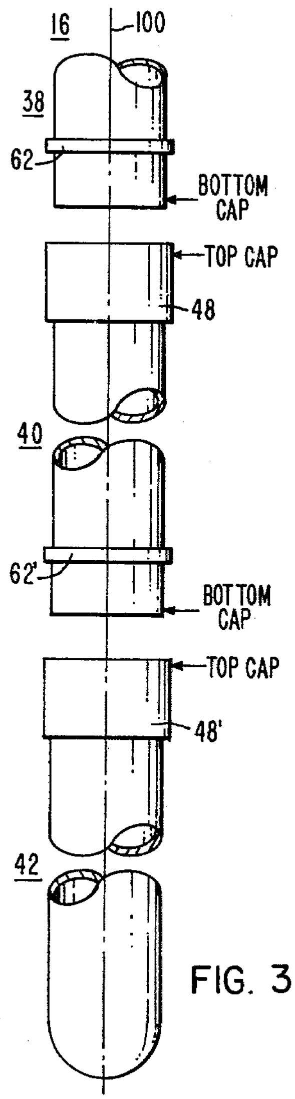
FIG. 3 is an exploded, elevational view of the cylinder shown in FIG. 1, illustrating the ends of the cylinder sections to be coupled, and indicating which of the two basic types of shipping caps would be applied to these ends during shipment, according to the teachings of the invention.

FIG. 3 is an exploded elevational view of hydraulic cylinder 16 shown in FIG. 1, illustrating the ends of the hydraulic cylinder sections to be coupled in the field, an thus protected with shipping cap assemblies according to the teachings of the invention. The invention teaches the use of two different basic shipping cap assemblies, referred to as top and bottom shipping cap assemblies, according to their positions on a cylinder section with reference to the vertically oriented operating position of the cylinder 16. As indicated in FIG. 3, a bottom shipping cap assembly will be fixed to the bottom ends of the top and intermediate cylinder sections 38 and 40, respectively, and a top shipping cap assembly will be fixed to the top ends of the intermediate and bottom cylinder sections 40 and 42, respectively.

Figure 4:
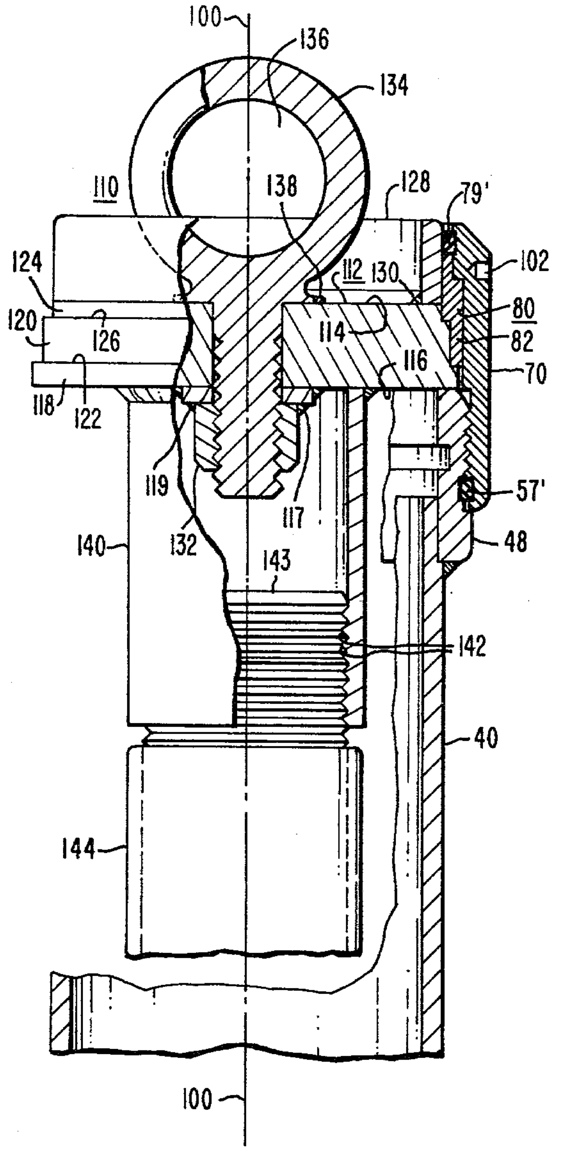
FIG. 4 is an elevational view shown partially in section and partially cut away, of a top shipping cap assembly secured to the upper end of a bottom, or intermediate, cylinder section, according to the teachings of the invention.

FIG. 4 is an elevational view, shown partially in section and partially cut away, of a first or top shipping cap assembly 110. For purposes of example, it will be assumed that shipping cap assembly 110 is assembled to protect the upper end of the intermediate cylinder section 40, as the assembly of a top shipping cap with the upper end of the bottom section 42 will be similar. The top shipping cap assembly 110 includes a first, generally cylindrical portion, which, as illustrated, may be a composite structure formed of a plate member 112 and a cylindrical, tubular member 128. Plate member 112, which may be formed of steel, has first and second flat parallel opposed surfaces 112 and 114, respectively, a predetermined thickness dimension, and a circular outer configuration. The circular outer configuration includes a first diameter adjacent to surface 116 which is sized according to the diameter of the first coupling member 48 that the shipping cap assembly 110 is to be associated with. The first diameter adjacent to surface 116, defined by edge surface 118, steps inwardly to a second or intermediate diameter, defined by surface 120, forming a shoulder 122 at the step. The intermediate diameter steps inwardly to a third diameter, defined by surface 124, forming a shoulder 126 at the step. Outer surfaces 120 and 124 and steps 122 and 126 are dimensioned to snugly receive the split ring assembly 80 shown in FIG. 2, as will be hereinafter described.

Cylindrical member 128, which may be formed of steel, has an O.D. substantially the same as that of the third or smallest diameter of plate section 112. One axial end of cylindrical member 128 is disposed against surface 112, and it is fixed in a co-axial position on center line 100 with plate member 112 by any suitable means, such as by the weld bead indicated at 130. The axial length of surface 120 is selected to provide support for a portion of the split ring 80 which extends past surface 114, and to provide support for an O-ring 79' which will provide a moisture seal between the tubular member 128 and the second coupling member 170, as will be hereinafter described.

Plate member 112 is drilled on center line 100, and a nut member 132 is centered and welded to its surface 116, as indicated by weld beads 117 and 119. A suitable handle 134 having an opening 136 at one end thereof for receiving a hoist hook, and a threaded shank on the other end, is inserted through the opening in the plate member 112 and threadably engaged with nut 132. Handle 134 is then welded at the intersection between the handle and surface 112, as indicated by weld bead 138.

Top shipping cap assembly 110 includes a second cylindrical portion provided by tubular member 140.

Tubular member 140, which may be formed of steel, includes first and second axial ends, with its first axial end being welded to surface 116 of plate member 112. Its I.D. is threaded adjacent to its second or outwardly extending axial end, indicated by threads 142. A coupling 143, which has one of its ends threadably engaged with the upper end of a plunger section 144, has its other end threadably engaged with threads 142, as indicated in FIG. 4.

In the assembly of the top shipping cap 110 with a cylinder section 40, the plunger section 144 is first secured to the top shipping cap 110, and plunger section 144 is inserted into the central opening of the cylinder section 40 until surface 116 of plate member 112 rests upon the outwardly extending end of the externally threaded first coupling member 48. Then, the same coupling components which will be used to form a cylinder joint, i.e. the split ring 80 and the second coupling member 70, are used as the fastening means for securing the top shipping cap assembly 110 to the cylinder section 40. An O-ring 57' is first placed about the first coupling member 48, adjacent to threads 56. The split ring 80 is then assembled about plate 112 and the first tubular cylindrical member 128. An O-ring 79' is disposed about the O.D. of tubular member 128, adjacent to the split ring 80. The second coupling member 70 is then lowered into position over the split ring 80, and it is threadably engaged with the first coupling member 48, to firmly secure the top shipping cap assembly 110 to the cylinder section 40, and to complete the moisture seals provided by O-rings 57' and 79'.

Figure 5:
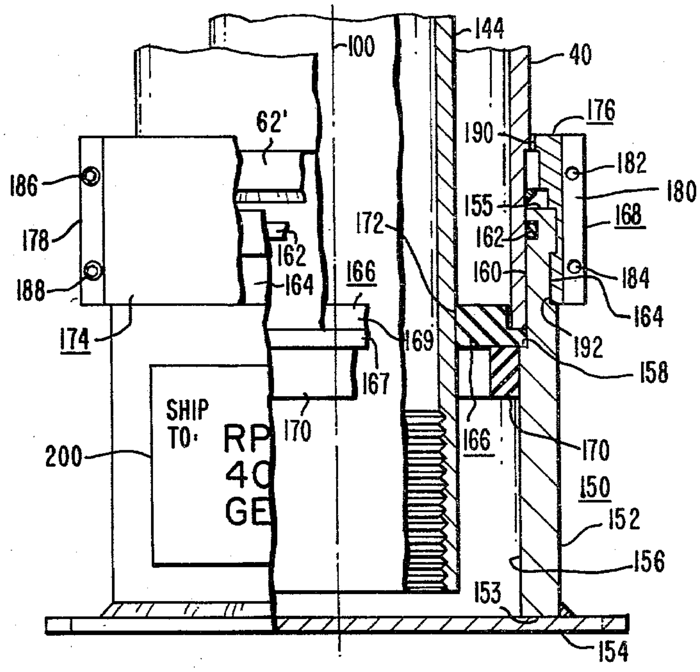
FIG. 5 is an elevational view shown partially in section and partially cut away, of a bottom shipping cap assembly secured to the lower end of a top, or intermediate, cylinder section, according to the teachings of the invention.

FIG. 5 is an elevational view, partially in section and partially cut away, of a second or bottom shipping cap assembly 150. The bottom shipping cap assembly 150 includes a tubular portion 152, which may be formed of steel, having first and second axial ends 153 and 155, respectively. Its first axial end 153 is closed, such as by a plate member 154, which is suitably fixed in this position, such as by welding. The tubular portion 152 has a first inside diameter, defined by surface 156, which steps to a second or larger I.D. intermediate its axial ends to define a shoulder 158. The second I.D., defined by surface 160, is provided with a circumferential groove adjacent to its second or open axial end 155 for receiving an O-ring 162.

The O.D. of tubular portion 152 includes a relatively wide circumferential groove 164 near its second axial end 155.

The bottom shipping cap assembly 150 is completed by a non-metallic ring member 166, and clamping means 168. The non-metallic ring member 166, which may be made of fiber, or other suitable tough non-metallic material, has a first diameter adjacent to one axial end, defined by surface 167, sized to snugly enter the second I.D. of tubular member 152 and rest against shoulder 158. A plurality of block members, such as block member 170, may be welded on the I.D. of member 152, to continue shoulder 158 and provide additional support for ring member 166, if desired. Ring member 166 has a second diameter, defined by surface 170, which is smaller than the first, having a dimension selected to be approximately equal to the I.D. of cylinder section 40. Ring member 166 has a central opening 172 sized to snugly receive and center the plunger section 144. Ring member 166 and shoulder 158 cooperatively provide a limit means which limits the advance of the cylinder section to be protected into the recess defined by tubular portion 152.

Clamping means 168 has first and second half sections 174 and 176, respectively, which have a smooth outer cylindrical surface which terminates at each end of the half in outwardly extending tab portions, such as tab portion 178 on half section 174 and tab portion 180 on half section 176. The tab portions 180 on half section 176 are drilled and tapped, as indicated at 182 and 184, and the tab portions 178 on half section 174 are drilled to receive bolts 186 and 188, such as Allen head bolts.

The I.D. of the clamping means 168 is formed to provide a lip 190 adjacent to one of its axial ends, which will overlap the circumferential stop 62' on the intermediate cylinder section 40, and a wider lip or inward extension 192 adjacent to its other axial end which is sized to enter the circumferential groove 164 in the O.D. of tubular member 152.

In the assembly of the bottom shipping cap 150 with the end of the intermediate cylinder section 40 which includes the circumferential stop 62', the non-metallic ring member 166 is telescoped over the end of plunger section 144 until it contacts the end of cylinder section 40. An O-ring 162 is placed in the groove in the I.D. adjacent to the open axial end of tubular member 152, and the assembly which includes member 152 is pushed into position over cylinder section 40 until shoulder 158 presses ring member 166 into the end of cylinder section 40. The two halves 174 and 176 of clamping means 168 are then assembled such that lip 190 engages one end of the circumferential stop 62', which is fixed to cylinder section 40, and lip 192 enters the circumferential groove 164 in the O.D. of tubular member 152. Bolts 186 and 188, and similar bolts on the opposite side of the assembly, are then inserted into the aligned openings in the tabs, where they are threadably engaged to complete the clamping function.

Figure 6:
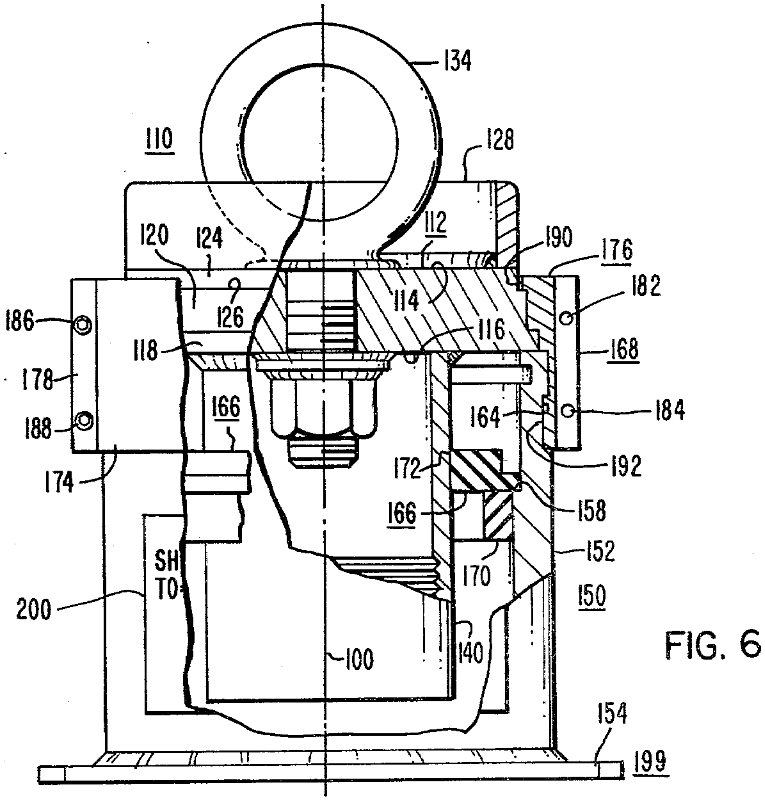
FIG. 6 is an elevational view, shown partially in section and partially cut away, of the top and bottom shipping caps shown in FIGS. 4 and 5, respectively, assembled to provide a complete, self-contained shipping package suitable for returning the shipping caps to the factory.

When the cylinder and jack sections are received at the job site, the top and bottom shipping cap assemblies 110 and 150, respectively, are removed at strategic times during field assembly of the plunger and cylinder sections, with the top shipping cap 110 aiding such assembly, as will be hereinafter described. The coupling hardware, when removed from the top shipping cap assembly, is immediately reused to form a cylinder joint between two cylinder sections, as shown in FIG. 2. As illustrated in FIG. 6, the top and bottom shipping cap assemblies from the intermediate cylinder section, and also the top and bottom shipping cap assemblies from the bottom and top cylinder sections, respectively, are assembled to provide a complete self-contained shipping package for returning the shipping caps to the factory. The coupling hardware just removed to free the bottom shipping cap from the cylinder section is now used to couple the top and bottom shipping caps into a unitary assembly.

More specifically, FIG. 6 is an elevational view, partially in section and partially cut away, of a shipping package 199 formed by the assembled top and bottom shipping caps 110 and 150 shown in FIGS. 4 and 5, respectively. The non-metallic ring member 166 is inserted into the recess defined by tubular member 152, until it rests against shoulder 158, or it may be telescoped over the end of cylindrical portion 140. Other small items to be returned to the factory may also be placed in this recess. The top shipping cap assembly 110 is then coupled with the bottom shipping cap assembly 150 until surface 116 of plate member 112 rests against the open axial end of tubular member 152. The two halves 174 and 176 of clamping means 168 are then assembled about plate member 112 and tubular member 152 such that lip 190 overlaps shoulder 126 of plate member 112, and lip 192 enters the circumferential groove 164 in the O.D. of tubular member 152. The four bolts, such as bolts 186 and 188, are then inserted into the aligned openings in the tapped portions of the clamping means, and they are tightened to complete the assembly.

A shipping label 200 is permanently fixed to the O.D. of tubular member 152, which provides the proper return address. No special packing is required, eliminating field packing costs, and the threaded I.D. of member 140 is completely enclosed and protected from damage. Thus, there are no exposed parts in the shipping package 199 which are susceptible to damage, permitting the top and bottom shipping caps to be reused many times.

Figure 7C:
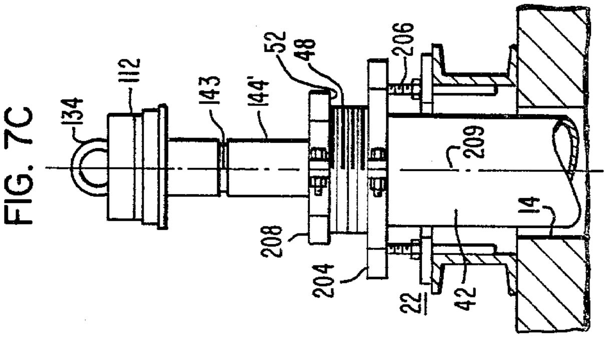
FIGS. 7A through 7F illustrate steps in the field assembly of the various plunger and cylinder sections, to show how the top shipping cap is also used in aiding such assembly.
Figure 7B:
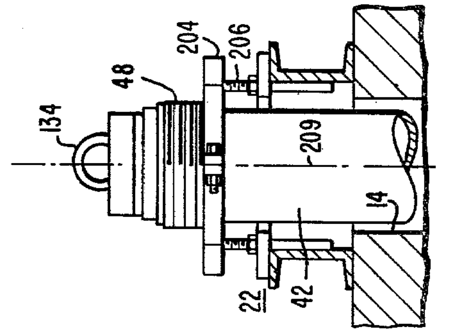
Figure 7A:
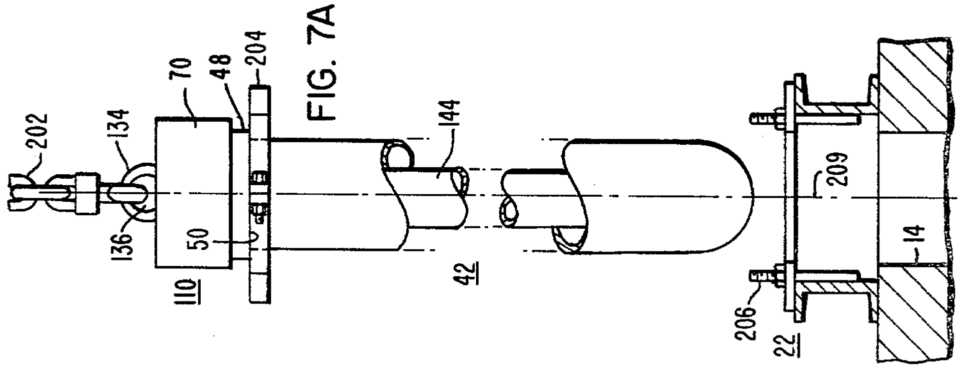

FIGS. 7A through 7F illustrate steps in the assembly of the plunger and cylinder sections in the field, to show how the shipping caps aid such assembly. As shown in FIG. 7A the bottom cylinder section with its top shipping cap 110 in place, is uprighted and lifted by a chainfall 202 into a vertically aligned position over the vertical longitudinal center line 209 of jack hole 14. The hook on chainfall 202 is linked with opening 136 of handle 134. A split clamp assembly 204 is assembled about cylinder 42, with the split clamp assembly 204 resting against the bottom end 50 of coupling member 48. As shown in FIG. 7B, the bottom cylinder section 42 is then lowered into the jack hole 14, until the clamp assembly 204 rests upon the top of four bolts 206, which are part of footing channel assembly 22 shown in FIG. 1, and which will later be used to secure brackets 20. Coupling member 70 is then unscrewed, and the split ring assembly 80 is removed.

As illustrated in FIG. 7C, handle 134 of the top shipping cap assembly 110 is then used to lift the plunger section 144' vertically upward and out of cylinder section 42 by a predetermined dimension. A split clamp assembly 208 is then assembled about the plunger section. Split clamp assembly 208 may then rest upon the upper end 52 of coupling member 48. Handle 134 and its associated plate member 112 are then unscrewed from coupling 143, and the lower cylinder assembly will be in the stage illustrated in FIG. 7D, with the bottom cylinder section 42 being supported by clamping means 204, and the plunger section 144' being supported by clamping means 208.

Figure 7F:
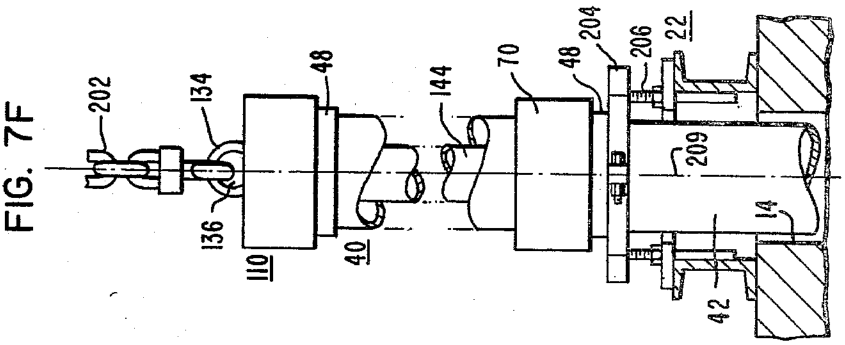
Figure 7E:
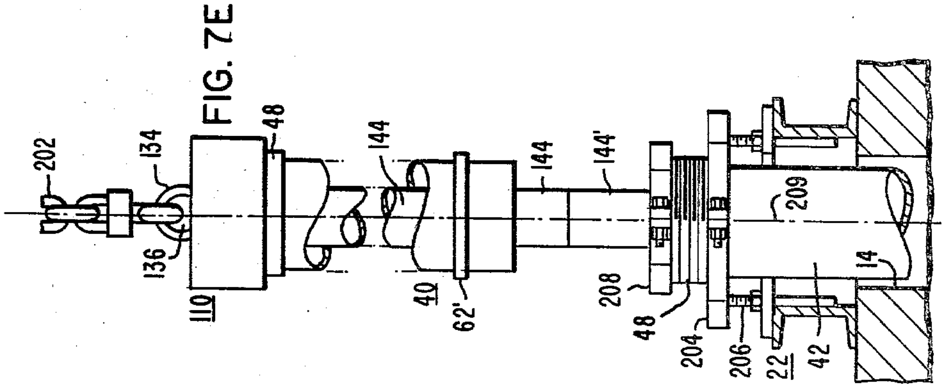
Figure 7D:
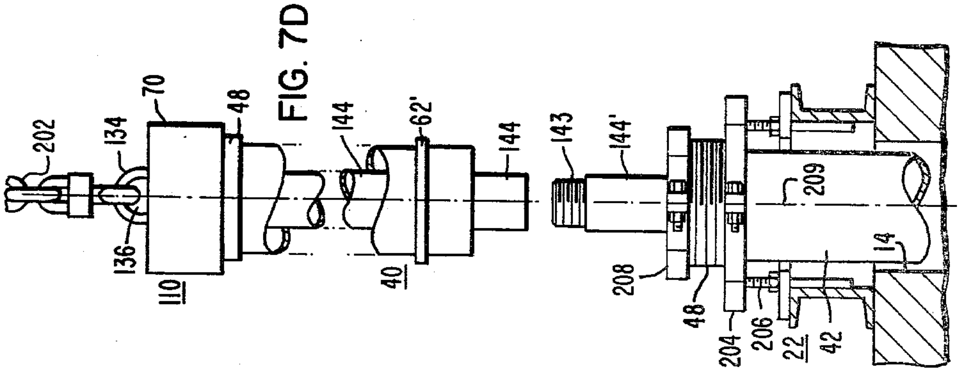

The next step, also shown in FIG. 7D, is to upright and lift the intermediate cylinder section 40 into a vertically aligned position over the bottom cylinder section 42, with the longitudinal center line 209 of the jack hole, the longitudinal center line of the bottom cylinder section 42 and the longitudinal center line of the intermediate cylinder section 40, all being in alignment. The uprighting and lifting step uses handle 134 on the top shipping cap assembly 110.

The bottom shipping cap assembly 150 may then be removed from the lower end of the intermediate cylinder section 40. FIG. 7D illustrates the intermediate cylinder section 40 after removal of the bottom shipping cap assembly 150. It will be noted that the plunger section 144 associated with the intermediate cylinder section 40 extends below the lower end of the intermediate cylinder section 40. During removal of the bottom shipping cap assembly 150, when the split clamp 168 is removed, the O-ring 162 holds the bottom section of the shipping cap in place. Lightly tapping the tubular portion of the shipping cap assembly then causes it to slide downwardly and off of the lower end of the cylinder section 40. Centering ring 166 is then pulled off of the lower end of the plunger section 144. Handle 134 of the top shipping cap assembly accurately centers and aligns the intermediate plunger section 144 with the lower plunger section 144', allowing the upper plunger section 144 to be lowered and then threadably engaged with the coupling member 143. FIG. 7E illustrates the bottom and intermediate plunger sections following this coupling step. Clamping means 208 disposed about plunger section 144' is then removed, enabling the intermediate cylinder section 40 and the two interconnected plunger sections to be lowered. Prior to this lowering step, however, coupling member 70, which was removed as the top shipping cap assembly 110 on the bottom cylinder section 42 was dismantled, is telescoped over the lower end of the intermediate cylinder section 40.

The intermediate cylinder section 40 is then lowered, using handle 134 on the top shipping cap assembly 110 and chainfall 202, until the lower end of the intermediate cylinder section 40 butts against the upper end of the lower cylinder section 42, which establishes the pressure seal provided by O-ring 60. O-ring 57 is placed in position, the split ring assembly 80 is placed into position, O-ring 79 is placed in position, and the coupling member 70 is lowered and turned to threadably engage coupling member 70 with member 48, which tightens and locks the two cylinder sections together. This step is shown in FIG. 7F. Clamping means 204 is then removed and used to clamp the intermediate cylinder section 40, enabling the interconnected intermediate and lower cylinder sections to be lowered into the jack hole 14, with the resulting assembly then appearing similar to that shown in FIG. 7B. The previously set forth steps are then followed to assemble any additional intermediate cylinder and plunger sections, and finally the top cylinder and plunger sections.

I claim as my invention:

1. A shipping assembly for a hydraulic jack having a cylinder which is shipped in sections, comprising:

first and second cylinder sections having first ends to be coupled, an externally threaded first coupling member fixed on the first end of said first cylinder section, a circumferential stop on the outer periphery of said second cylinder section, a split ring adapted for assembly about said second cylinder section, an internally threaded second coupling member having an aperture larger than the diameter of said circumferential stop, said second coupling member being adapted for assembly over the first end of said second cylinder section, said circumferential stop, and said split ring, when said first and second cylinder sections are assembled, said split ring being constructed to cooperate with said circumferential stop to limit movement of the second coupling member towards the first end of said second cylinder section, when said first and second coupling members are threadably engaged, a first shipping cap assembly enclosing the first end of said first cylinder section during shipment, said first shipping cap assembly including a cylindrical portion secured to said first end via said split ring and said internally threaded second coupling member, wherein said split ring is assembled about the cylindrical portion of said first shipping cap, and said second coupling member is telescoped over the split ring and threadably engaged with said externally threaded first coupling member, and a second shipping cap assembly enclosing the first end of said second cylinder section, said second shipping cap assembly including a tubular portion having an open end and a closed end, defining a recess, limit means in said recess, and clamping means, wherein the first end of said second cylinder section extends into the open end of said tubular portion for a predetermined dimension controlled by said limit means, and said clamping means links the circumferential stop on said second cylinder section and the tubular portion of said second shipping cap assembly, to maintain said tubular portion in assembled relation with said second cylinder section.

2. The shipping assembly of claim 1 wherein the cylindrical portion of the first shipping cap assembly, and the tubular portion of the second shipping cap assembly are cooperatively configured such that they may be assembled, and maintained in assembled relation by the clamping means of the second shipping cap assembly, and including shipping label means fixed to the tubular portion of the second shipping cap assembly.

3. The shipping assembly of claim 1 wherein the limit means in the recess of the tubular portion of the second shipping cap assembly includes an integral shoulder portion in the inside diameter of the tubular portion and a non-metallic ring member disposed against said shoulder portion, wherein the first end of the second cylinder section butts against said non-metallic ring member.

4. The shipping assembly of claim 3 wherein the ring member includes a central opening, and including a plunger for the hydraulic jack disposed within said second cylinder section, with one end of said plunger extending in snug relation through the central opening of the ring member.

5. The shipping assembly of claim 1 including a resilient sealing member disposed between the inner wall of the tubular portion of the second shipping cap assembly and the second cylinder section.

6. The shipping assembly of claim 1 wherein the cylindrical portion of the first shipping cap assembly includes a first axial end which cooperates with the split ring, and a second axial end which extends into the first end of the first cylinder section, and including a resilient sealing member disposed between the first axial end and the second coupling member.

7. The shipping assembly of claim 6 including a plunger section for the hydraulic jack disposed within the first cylinder section, secured to the second axial end of the cylindrical portion of the first shipping cap assembly.

8. The shipping assembly of claim 1 wherein the clamping means is a split ring coupled in assembled relation via threaded fastening means.

9. The shipping assembly of claim 1 including a first resilient sealing member disposed in sealing engagement between the cylindrical portion of the first shipping cap assembly and the second coupling member, and a second resilient sealing member disposed in sealing engagement between the first and second coupling members.

10. A shipping assembly for an intermediate section of a cylinder for a hydraulic jack which is shipped in sections, comprising:

an intermediate cylinder section having first and second ends, first and second cylinder sections having first ends to be coupled to the first and second ends, respectively, of said intermediate section, an externally threaded first coupling member fixed to the second end of said intermediate cylinder section, a circumferential stop on the outer periphery of said intermediate cylinder section, adjacent to its first end, a circumferential stop on the outer periphery of said second cylinder section, adjacent to its first end, a split ring adapted for assembly about said second cylinder section, an internally threaded second coupling member having an aperture larger than the diameter of the circumferential stop on said cylinder section, said second coupling member being adapted for assembly over the first end of said second cylinder section, including its circumferential stop, and said split ring, when said second and intermediate cylinder sections are assembled, said split ring being constructed to cooperate with the circumferential stop on said second cylinder section to limit movement of the second coupling member towards the first end of said second cylinder section, when said first and second coupling members are threadably engaged, a first shipping cap assembly enclosing the second end of said intermediate cylinder section during shipment, said first shipping cap assembly including a cylindrical portion secured to said second end via said split ring and said internally threaded second coupling member, wherein said split ring is assembled about the cylindrical portion of said first shipping cap, and said second coupling member is telescoped over the split ring and threadably engaged with said externally threaded first coupling member, and a second shipping cap assembly enclosing the first end of said intermediate cylinder section, said second shipping cap assembly including a tubular portion having an open end and a closed end, defining a recess, limit means in said recess, and clamping means, wherein the first end of said second cylinder section extends into the open end of said tubular portion for a dimension controlled by said limit means, and said clamping means links the circumferential stop on said intermediate cylinder section and the tubular portion of said second shipping cap assembly, to maintain said tubular portion in assembled relation with said intermediate cylinder section.

11. The shipping assembly of claim 10 wherein the cylindrical portion of the first shipping cap assembly, and the tubular portion of the second shipping cap assembly are cooperatively configured such that they may be assembled and maintained in assembled relation by the clamping means of the second shipping cap assembly, and including shipping label means fixed to the tubular portion of the second shipping cap assembly.

12. The shipping assembly of claim 10 wherein the limit means in the recess of the tubular portion of the second shipping cap assembly includes an integral shoulder portion in the inside diameter of the tubular portion and a non-metallic ring member disposed against said shoulder portion, wherein the first end of the intermediate cylinder section butts against said non-metallic ring member.

13. The shipping assembly of claim 12 wherein the ring member includes a central opening, and including a plunger for the hydraulic jack disposed within said intermediate cylinder section, with one end of said plunger section extending in snug relation through the central opening of the ring member.

14. The shipping assembly of claim 10 including a resilient sealing member disposed between the inner wall of the tubular portion of the second shipping cap assembly and the intermediate cylinder section.

15. The shipping assembly of claim 10 wherein the cylindrical portion of the first shipping cap assembly includes a first cylindrical end which cooperates with the split ring, and a second cylindrical end which extends into the second end of the intermediate cylinder section, and including a resilient sealing member disposed between the first cylindrical end and the second coupling member.

16. The shipping assembly of claim 15 including a plunger section for the hydraulic jack disposed within the intermediate cylinder section, secured to the second cylindrical end of the cylindrical portion of the first shipping cap assembly.

17. The shipping assembly of claim 10 wherein the clamping means is a split ring coupled in assembled relation via threaded fastening means.

18. The shipping assembly of claim 10 including a first resilient sealing member disposed in sealing engagement between the cylindrical portion of the first shipping cap assembly and the second coupling member, and a second resilient sealing member disposed in sealing engagement between the first and second coupling members.

19. The shipping assembly of claim 15 including a plunger section for the hydraulic jack disposed within the intermediate section, secured to the cylindrical portion of the first shipping cap assembly, and wherein the limit means includes a non-metallic ring member defining an opening therein, with said plunger section being disposed in snug relation through said opening.

20. A shipping assembly for a hydraulic jack having a cylinder shipped to a job site in sections, comprising:
first and second cylinder sections having ends to be protected during shipment,
first fastening means for joining said first and second cylinder sections,
a first shipping cap,
said first shipping cap being secured to a predetermined end of a predetermined cylinder section with said first fastening means,
a second shipping cap,
and second fastening means,
said second shipping cap being secured to a predetermined end of a predetermined cylinder section with said second fastening means,
said first and second shipping caps being cooperatively configured to facilitate assembly thereof into a self-contained shipping package, using said second fastening means to maintain the assembled relation.

21. The shipping assembly of claim 20 including a plunger section disposed within each of said first and second cylinder sections, with one of the first and second shipping caps including means for securing a plunger section thereto, and the other of the shipping caps including means for centering a plunger section within the associated cylinder section.

22. The shipping assembly of claim 20 including a shipping label fixed to at least one of the shipping caps for use when the shipping caps are assembled into a self-contained shipping package.

23. A method of assembling a sectioned hydraulic jack in a jack hole, including a bottom section and a second section to be connected thereto, wherein each section includes a tubular cylinder section and a plunger section disposed within the cylinder section, with each having upper and lower ends, comprising the steps of:
providing a first top shipping cap assembly, which includes a handle, for the bottom section, with the top shipping cap assembly being releasably and independently fixed to both the upper end of the associated plunger section, and the upper end of the associated cylinder section,
providing a bottom shipping cap assembly for the second section which centers the lower end of the associated plunger section and is releasably fixed to the lower end of the associated cylinder section,
uprighting the bottom section using hoisting means linked to the handle on the first top shipping cap assembly,
aligning the uprighted bottom section over the jack hole, using the hoisting means and handle on the first top shipping cap assembly,
clamping the bottom cylinder section with clamping means,
lowering the bottom section in the jack hole, until the clamping means stops the downward travel of the bottom section and supports the weight thereof,
releasing the first top shipping cap assembly from the upper end of the bottom cylinder section,
lifting the plunger section vertically upward a predetermined distance, using the handle on the first top shipping cap assembly,
clamping the plunger section with clamping means,
supporting the plunger section with the clamping means,
uprighting the second section,
aligning the uprighted second section over the bottom section,
releasing and removing the bottom shipping cap assembly from the second section,
coupling the plunger section of the second section to the plunger section of the bottom section,
removing the clamping means from the plunger section associated with the bottom section,
lowering the second cylinder section and connected plunger sections until the lower end of the second cylinder section butts the upper end of the bottom cylinder section, and
coupling the bottom and second cylinder sections.

24. The method of claim 23 including the step of providing a second top shipping cap assembly, which includes a handle, for the second section, with the top shipping cap assembly being releasably and independently fixed to both the upper end of the associated plunger section and to the upper end of the associated cylinder section,
and wherein the step of uprighting and aligning the second section uses hoisting means linked to the handle on the second top shipping cap assembly.

* * * * *